United States Patent
Caporale et al.

(10) Patent No.: US 10,353,602 B2
(45) Date of Patent: Jul. 16, 2019

(54) SELECTION OF FABRIC-ATTACHED STORAGE DRIVES ON WHICH TO PROVISION DRIVE VOLUMES FOR REALIZING LOGICAL VOLUME ON CLIENT COMPUTING DEVICE WITHIN STORAGE AREA NETWORK

(71) Applicant: Lenovo Enterprise Solutions (Singapore) PTE. LTD., New Tech Park (SG)

(72) Inventors: Patrick Leo Caporale, Cary, NC (US); Michael Neil Condict, Hurdle Mills, NC (US); David W. Cosby, Raleigh, NC (US); Jonathan Randall Hinkle, Morrisville, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 216 days.

(21) Appl. No.: 15/365,333

(22) Filed: Nov. 30, 2016

(65) Prior Publication Data

US 2018/0150244 A1 May 31, 2018

(51) Int. Cl.
G06F 3/06 (2006.01)

(52) U.S. Cl.
CPC ............ *G06F 3/0619* (2013.01); *G06F 3/065* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 6,151,659 A | 11/2000 | Solomon et al. | |
| 6,889,309 B1 | 5/2005 | Oliveira et al. | |
| 7,251,709 B2 | 7/2007 | Williams | |
| 7,702,906 B1 | 4/2010 | Karr et al. | |
| 9,448,735 B1 | 9/2016 | Proulx et al. | |
| 9,727,379 B1 * | 8/2017 | Wilkes | G06F 9/5038 |

(Continued)

OTHER PUBLICATIONS

U.S. Appl. No. 15/084,908, filed Mar. 30, 2016, 63 pp.
(Continued)

*Primary Examiner* — Tracy C. Chan
(74) *Attorney, Agent, or Firm* — Jason Friday (57) ABSTRACT

A storage-area network (SAN) manager running on a computing device connected to a fabric receives a request to allocate and mount a logical volume on a client computing device connected to the fabric. The manager groups storage drives connected to the fabric by failure domains. The manager filters the storage drives by native capabilities, available capacities, and dynamic performance to remove from consideration any storage drive having insufficient native capabilities, an insufficient available capacity, and/or an insufficient dynamic performance to satisfy the request. The manager selects a set of storage drives on which to store data of the logical volume, from the remaining storage drives, taking into account the failure domains. The manager sends a command to each such storage drive to provision a drive volume, and a command to a software agent on the client device to create and mount the logical volume using these drive volumes.

16 Claims, 6 Drawing Sheets

(56) References Cited

U.S. PATENT DOCUMENTS

| | | | |
|---|---|---|---|
| 9,983,807 B1* | 5/2018 | Tylik | G06F 3/0619 |
| 10,031,857 B2 | 7/2018 | Menachem et al. | |
| 10,042,721 B2 | 8/2018 | Condict et al. | |
| 10,296,247 B2 | 5/2019 | Caporale et al. | |
| 2001/0019614 A1 | 9/2001 | Madoukh | |
| 2005/0193128 A1 | 9/2005 | Dawson et al. | |
| 2006/0059253 A1 | 3/2006 | Goodman et al. | |
| 2006/0282636 A1 | 12/2006 | Yamamoto et al. | |
| 2007/0206224 A1 | 9/2007 | Nagashima et al. | |
| 2011/0022812 A1 | 1/2011 | Van Der et al. | |
| 2012/0102268 A1 | 4/2012 | Smith et al. | |
| 2012/0233463 A1* | 9/2012 | Holt | G06F 17/30575 |
| | | | 713/168 |
| 2013/0067187 A1* | 3/2013 | Moss | G06F 3/0689 |
| | | | 711/170 |
| 2013/0297907 A1 | 11/2013 | Ki et al. | |
| 2015/0149625 A1 | 5/2015 | Piro, Jr. et al. | |
| 2015/0288783 A1 | 10/2015 | Ma et al. | |
| 2016/0004475 A1 | 1/2016 | Beniyama et al. | |
| 2018/0107409 A1 | 4/2018 | Condict et al. | |
| 2018/0143776 A1 | 5/2018 | Caporale et al. | |
| 2018/0205603 A1 | 7/2018 | Condict et al. | |
| 2018/0260123 A1 | 9/2018 | Andresen et al. | |

OTHER PUBLICATIONS

U.S. Appl. No. 15/451,718, filed Mar. 7, 2017, 65 pp.
U.S. Appl. No. 15/406,299, filed Jan. 13, 2017, 62 pp.
Crowley, P. 'Programmable Peripheral Devices, http://www.cs.wustl.edu/~pcrowley/papers/generals.pdf, dated no later than May 14, 2014.
Hot spare, Wikipedia.com, <https://en.wikipedia.org/wiki/Hot_spare>, last edited Nov. 13, 2015, accessed Jan. 11, 2016, 2 pp.
Rashmi, K.V. et al., "A "Hitchhiker's" Guide to Fast and Efficient Data Reconstruction in Erasure-coded Data Centers", SIGCOMM'14, Aug. 17-22, 2014, Chicago, USA, 12 pp.
Khasymski, A. et al., "Realizing Accelerated Cost-Effective Distributed RAID", Handbook on Data Centers. Springer New York, 2015. 24 pp.
Yu Hu, Xiao et al., "Efficient Implementations of the Sum-Product Algorithm for Decoding LDPC Codes", IBM Research, Zurich Research Laboratory, CH-8803 Ruschlikon, Switzerland, IEEE 2001, 6 pp.
Bryant, C., "HGST Demos Ethernet as a Storage Drive Interface", tom's IT PRO, online <http://www.tomsitpro.com/articles/hgst-10gbps-ethernet-cloud-stor . . . >, 4 pp.
Swartz, K.L., "3PAR Fast RAID: High Performance Without Compromise", 2010, 3PAR Inc., 11 pp.
Introduction to Toshiba Key Value Drive Technology, Toshiba Corporation, May 2015, 13 pp.
Storage Monitoring for HDDs and RAID Controllers, Oracle Storage Monitoring and Zone Management, online <https://docs.oracle.com/cd/E19201-01/820-6410-12/ilom_storagemonitor . . . >, copyright 2010, accessed Jan. 11, 2016, 9 pp.
Armstrong, A, "Toshiba Announces Key Value-Based Technology for Object Storage", online <http://www.storagereview.com/toshiba_announces_key_valuebase . . . >, May 18, 2015, 2 pp.
Whitepaper, Key Value Drive, Toshiba Corporation, May 2015, 10 pp.
Brown, K. , "Fabric Attached Storage: The Convergence of NAS & SAN", COMNET Washington DC., Jan. 28, 2002, 15 pp.
Cooke, A., "An Introduction to Scale-Up vs. Scale-Out Storage", Enterprise Storage Guide, online <http://www.enterprisestorageguide.com/introduction-scale-vs-scale-storage>, Mar. 6, 2014, 5 pp.
Wilmsen, M., "Hyper converged vs. traditional SAN/NAS?", Virtual Hike, online <http://virtual-hike.com/hyper-converged-or-a-traditional-sannas/>, Jun. 4, 2015, 2 pp.
U.S. Appl. No. 15/295,596, filed Oct. 17, 2016, 68 pp.
U.S. Appl. No. 15/357,267, filed Nov. 21, 2016.

* cited by examiner

SELECTION OF FABRIC-ATTACHED STORAGE DRIVES ON WHICH TO PROVISION DRIVE VOLUMES FOR REALIZING LOGICAL VOLUME ON CLIENT COMPUTING DEVICE WITHIN STORAGE AREA NETWORK

BACKGROUND

Data is the lifeblood of many entities like businesses and governmental organizations, as well as individual users. To store large amounts of data, many enterprises and other organizations rely upon storage-area networks (SANs). A SAN is a network that provides access to consolidated, block-level data storage of a number of different storage drives. The storage is provided as a logical volume, or logical unit number (LUN), which is a virtual storage drive. To a computing device like a server, which is a client computing device within the SAN, the virtual storage drive appears as a locally attached storage drive.

SUMMARY

An example method includes receiving, by a storage-area network (SAN) manager running on a computing device directly connected to a fabric, a request from an administrator to allocate and mount a logical volume on a client computing device directly connected to the fabric. The method includes grouping, by the SAN manager, storage drives directly connected to the fabric by failure domains in which the storage drives are located. The method includes filtering, by the SAN manager, the storage drives by native capabilities, available capacities, and dynamic performance thereof to remove from selection consideration any storage drive having one or more of insufficient native capabilities, an insufficient available capacity, or an insufficient dynamic performance to satisfy the request. The method includes selecting, by the SAN manager, a set of storage drives on which to store data of the logical volume, from the storage drives that remain for the selection consideration after the storage drives have been filtered, including taking into account the failure domains in which the storage drives of the set are located in satisfaction of the request. The method includes sending, by the SAN manager, a command to each storage drive of the selected set to provision a drive volume. The method includes sending, by the SAN manager, a command to a SAN software agent on the client computing device to create and mount the logical volume using the drive volumes provisioned on the storage drives of the set.

An example non-transitory computer-readable data storage medium stores computer-executable code a computing device directly connected to a fabric and running a SAN manager executes to perform a method. The method includes receiving a request from an administrator to allocate and mount a logical volume on a client computing device directly connected to the fabric. The method includes selecting a set of storage drives on which to store data of the logical volume, from storage drives directly connected to the fabric, based on native capabilities, available capacities, and dynamic performance of the storage drives, and taking into account failure domains in which the storage drives of the set are located in satisfaction of the request. The method includes sending a command to each storage drive of the selected set to provision a drive volume. The method includes sending a command to a SAN software agent on the client computing device to create and mount the logical volume using the drive volumes provisioned on the storage drives of the set.

An example SAN system includes fabric-attachable storage drives directly connected to a fabric. Each storage drive of a set of the storage drives to provision and operate a drive volume. The SAN system includes a client computing device directly connected to the fabric, and that is to execute a SAN software agent to create, mount, and use a logical volume realized by drive volumes of the set of storage drives. The SAN system includes a SAN manager directly connected to the fabric and that is to manage the drive volumes of the storage drives, to manage the logical volume that the SAN software agent operates. The SAN manager is to select the set of the storage drives from the storage drives directly connected to the fabric on which the SAN software agent is to create, mount, and use the logical volume on drive volumes provisioned thereon.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a SAN is a network by which the physical storage of different storage drives is accessible to client computing devices on a consolidated, block-level basis as virtual storage drives that the client computing devices can treat similarly to locally attached storage drives. A SAN cluster can include a storage controller and multiple storage drives. The storage controller hides the complexity of the underlying implementation of the logical storage drives from the client computing devices. Therefore, features such as fault tolerance via a redundant array of independent disks (RAID), high availability, thin provisioning, transparent migration, snapshotting, and disaster recovery can be provided at the SAN cluster level via the storage controller.

As storage drives such as solid-state drives have increased in performance, different strategies have been employed to realize these performance benefits within SANs. One such strategy is described in the patent application entitled "storage area network having fabric-attached storage drives, SAN-agent executing client devices, and SAN manager," filed on Oct. 17, 2016, and assigned patent application Ser. No. 15/295,596, which is hereby incorporated by reference. This strategy specifically realizes a distributed SAN.

Such a SAN system includes fabric-attachable storage drives that are each directly connected to a fabric. Client computing devices are also directly connected to the fabric, as is a SAN manager. Each client computing device runs a SAN software agent. The SAN manager manages drive volumes that the storage drives may thinly provision, and further manages logical volumes that the SAN software agents create from the drive volumes. The SAN software agent of a client computing device handles input/output (I/O) requests generated within the client device for a logical volume, and directly accesses the drive volumes on the storage drives that realize the logical volume, without involving the SAN manager.

As such, management of the drive volumes occurs at the SAN manager level, but allocation and deallocation of the drive volumes occurs at the storage drives themselves under direction of the SAN manager. Similarly, management of the logical volumes occurs at the SAN manager level, but allocation and deallocation of the logical volumes occurs at the client computing devices themselves, by their SAN software agents under direction of the SAN manager. This means that higher-level storage functionality like fault tolerance, high availability, snapshotting, and so on, is achieved by the SAN software agents themselves. I/O access to the drive volumes that make up a logical volume occurs through the SAN software agent of the client computing device at which the I/O access originates.

Such a distributed SAN approach centralizes just the management of drive volumes and logical volumes that are realized by the drive volumes, although a SAN manager itself may be implemented in a distributed manner. The storage drives maintain their own drive volumes, and can even be unaware that they are participating in a SAN and as such may be unaware that there are other storage drives maintaining their own drive volumes. The client computing devices, via their SAN software agents, maintain their own logical volumes, and thus can individually and selectively provide for the higher-level storage functionality desired, if any, although multiple client devices can share (i.e., mount) the same logical volumes.

From the perspective of a storage drive, the storage drive maintains multiple drive volumes that the storage drive thinly provisions. The storage drive allocates and deallocates the drive volumes at the behest of the SAN manager. The storage drive writes data to and retrieves data from its drive volumes at the behest of the SAN software agents of the client computing devices. From the perspective of a client computing device, the SAN storage agent running thereon can maintain multiple logical volumes. The SAN storage agent allocates and deallocates the logical volumes at the behest of the SAN manager, using the drive volumes of the storage drives as the SAN manager directs.

Such a distributed SAN can permit more heterogeneity in the storage drives directly connected to a fabric than is typically found in more conventional, non-distributed SANs, which usually include much more homogeneous storage drives. For example, a distributed SAN can include different types of drives, having different technologies by which they connect to the fabric, different rated data transfer rates, different internal data block storage sizes, and different technologies by which they store data. In a non-distributed SAN, the selection of one storage drive over another storage drive is constrained primarily to just ensuring that the selected storage drive has sufficient capacity for a requested volume. By comparison, in a distributed SAN, storage drive selection has much greater consequences, implicating network latency, failure domains, and logical volume performance.

Disclosed herein are thus techniques for a SAN manager to select a set of storage drives from those directly connected to a fabric on which to provision drive volumes to realize a requested logical volume for a client computing device also directly connected to the fabric. The storage drives connected to the fabric can be grouped into failure domains in which they are located. A given failure domain includes those storage drives that will fail when a failure to which the failure domain corresponds occurs. For example, if some storage drives are connected to one power source and other storage drives are connected to a different source of power, the former storage drives are in a different failure domain than the latter storage drives.

The storage drives are filtered by native capabilities, available capacities, and dynamic performance thereof to remove from consideration any storage drive having insufficient native capabilities, available capacities, and/or dynamic performance to implement the requested logical volume. For instance, a requested logical volume may require a certain specified performance level that some storage drives cannot natively accommodate, due to the technology by which they store data (spinning magnetic disks as opposed to faster semiconductor flash memory) as one example. Therefore, such storage drives are removed from consideration.

Likewise, any storage drive that does not have sufficient available capacity to provision a drive volume of appropriate size for the required storage need of the requested logical volume is removed from consideration. Storage drives can also be removed from consideration if they have insufficient dynamic performance, regardless of their native capabilities. For example, a given storage drive may have specifications that in theory can satisfy the required performance level of a requested logical volume. However, the storage drive may already be operating at or near its performance ability, and/or may be connected to the client computing device along a network path that is relatively slow. Therefore, a drive volume provisioned on such a storage drive is unlikely to satisfactorily implement the requested logical volume in practice, and thus the storage drive is also removed from consideration.

Once the storage drives have been filtered, a set of storage drives from those remaining is selected. This selection can take into account the failure domains in which the storage drives have been grouped. For instance, depending on the redundancy specified for the requested logical volume, the drives may be differently selected from at least a specified number of failure domains. Once this set of storage drives has been selected, the SAN manager sends a command to each selected storage drive to provision a drive volume, and then sends a command to a SAN software agent on the client computing device to create and mount the logical volume using the drive volumes provisioned on the selected set.

Figure 1:
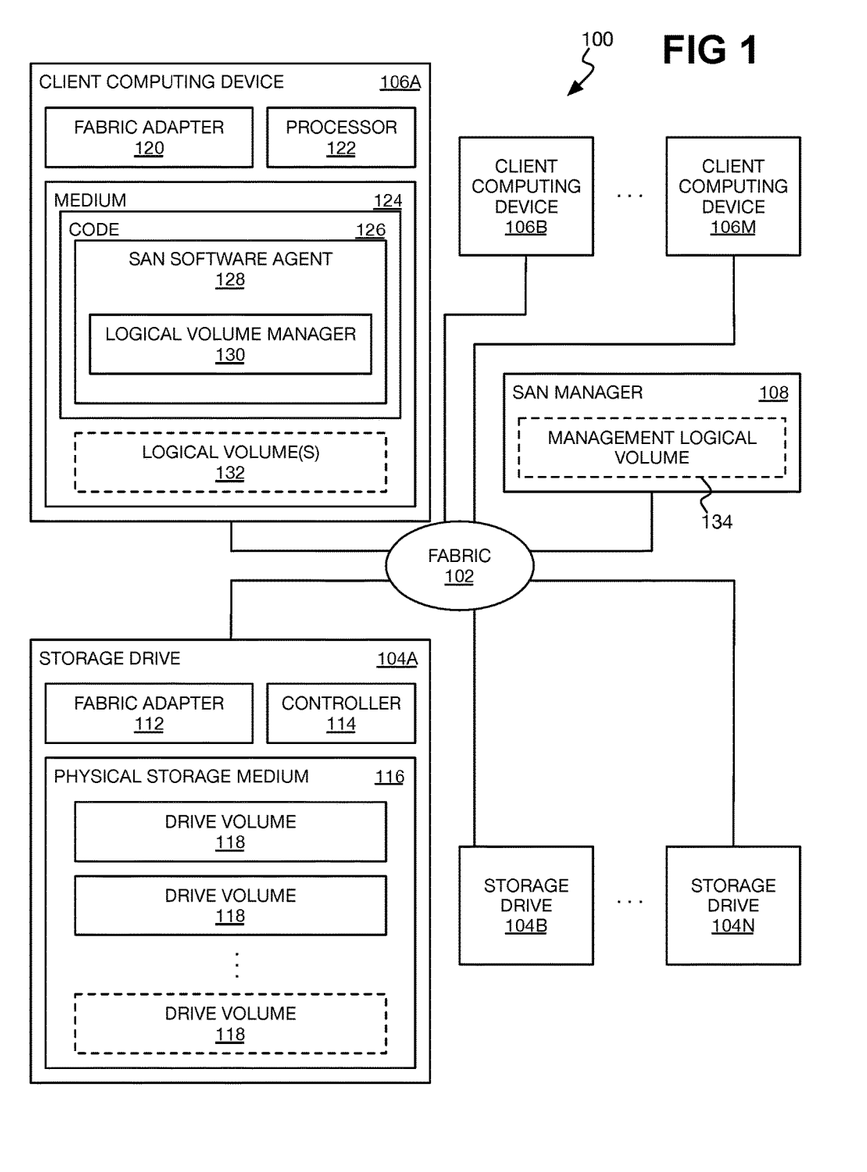
FIG. 1 is a diagram of an example distributed storage-area network (SAN) system.

FIG. 1 shows an example distributed SAN system 100. The system 100 includes a fabric 102. The fabric 102 can be a fibre channel fabric, a fibre channel over Ethernet (FCoE) fabric, an Internet small computer system interface (iSCSI) fabric, a serial attached SCSI (SAS) fabric, an InfiniBand fabric, a non-volatile memory Express (NVMe) over Ethernet or fibre channel fabric, or another type of fabric. In general, the fabric 102 is a SAN fabric.

Storage drives 104A, 104B, . . . 104N, which are collectively referred to as the storage drives 104, are each directly connected to and directly addressable on the fabric 102. Reference to a singular storage drive 104 herein pertains to any of the storage drives 104 individually. Client computing devices 106A, 106B, . . . 106M, which are collectively referred to as the client computing devices 106, are also each directly connected to the fabric 102. Reference to a singular computing device 106 herein pertains to any of the client computing device 106 individually. There may be more or fewer computing devices 106 than storage drives 104. A SAN manager 108 is also directly connected to the fabric 102.

The storage drive 104A is described herein in detail as representative of each storage drive 104. The storage drive 104A includes a fabric adapter 112, which is the hardware that permits the storage drive 104A to directly connect to the fabric 102. The storage drive 104A includes a controller 114, which can be implemented as a general-purpose processor executing code from memory, as an application-specific integrated circuit (ASIC), as a field-programmable gate array (FPGA), or in another manner. The storage drive 104A includes a physical storage medium 116, which is a non-volatile medium, such as a magnetic medium like one or more hard disk drive platters, or semiconductor memory like a number of semiconductor ICs of the type found in a solid-state drive (SSD). The physical storage medium 116, however, may not be a complete hard disk drive or SSD in and of itself.

The controller 114 is able to provision, such as thinly provision, as well as deprovision drive volumes 118 on the physical storage medium 116 responsive to commands that the controller 114 receives over the fabric 102 via the fabric adapter 112. Thin provisioning in particular creates sparse drive volumes 118, and is a manner by which available physical storage space on the storage medium 116 is allocated based on the minimum space required by any drive volume 118 at any time. The drive volumes 118 of the storage drives 104 physically store the data within the SAN system 100 of FIG. 1. Responsive to commands that the controller 114 receives over the fabric 102 via the fabric adapter 112, the controller 114 also is able to access data in relation to the drive volumes 118, including reading, writing, updating, and deleting the data.

The storage drive 104A thus operates the drive volumes 118 thereon, which means that the controller 114 is able to provision and deprovision the drive volumes 118 as well as is able to access data in relation to the drive volumes 118, responsive to commands received over the fabric 102. The storage drive 104A exposes or exports access to the physical storage medium 116 on a storage block-level basis. As such, once a drive volume 118 has been provisioned, access of data in relation to the drive volume 118 occurs on a block-level basis.

An example of a storage drive 104A is an NVMe storage drive that is programmable and exports access thereto via the NVMe over fabrics network protocol. This protocol provides support for allocation and deallocation of namespaces. The namespaces functionally correspond to SCSI LUNs, and thus can be used to implement the drive volumes 118.

Another example of a storage drive 104A is an Ethernet-attached programmable storage drive. A programmable storage drive can be one that lacks a SATA interface or other type of interface that is commonly found in "dumb" disk drives to interface with a bus of a host computing device. Rather, a programmable storage drive may lack any type of external interface to which to connect directly to a bus of a host computing device, and instead may have just the fabric adapter 112 to connect to the fabric 102. In this respect, a programmable storage drive differs from a conventional network-attached storage (NAS), which generally includes therein one or more separate "dumb" disk drives that are connected to a bus, such as a SATA bus, via corresponding interfaces.

The programmability of a programmable storage drive can be used, for instance, to implement an iSCSI target that supports multiple logical unit numbers (LUNs), and network commands to provision and deprovision (i.e., allocate and deallocate) the LUNs. The drive volumes 118 can be implemented as files within a local file system of the programmable storage drive. Such files are thinly provisioned, since storage for blocks of files is not allocated until a file block is written. A programmable storage drive that runs the Linux operating system, for instance, can implement a Linux-I/O target (LIO) SCSI target to achieve this.

A third example of a storage drive 104A is an enclosure that contains one or more non-programmable storage drives. The enclosure can include firmware or software that permits access over the fabric 102 to the each non-programmable storage drive individually, in a "just a bunch of drives" (JBOD) manner. For example, the non-programmable storage drives may be NVMe drives, with the firmware or software of the enclosure implementing the NVMe over fabrics protocol, so that each NVMe drive is separately exposed on the fabric 102.

A fourth example of a storage drive 104A is a hyper-converged computing device. The physical storage of the storage drives locally attached to the computing device is used within the computing device itself. However, the computing device also exports access to the physical storage, such as via iSCSI, via the NVMe over fabrics protocol, or in another manner.

The client computing device 106A is described herein in detail as representative of each client computing device 106. The client computing device 106A can be a server computing device or system, and is considered a client computing device in that within the SAN of FIG. 1, it is a client of the (host) storage drives 104 that store data on physical storage media 116. The client computing device 106A includes a fabric adapter 120, which is hardware that permits the computing device 106A to directly connect to the fabric 102. The client computing device 106A includes a processor 122, such as a general-purpose processor, and a non-transitory computer-readable data storage medium 124, which may include volatile and/or non-volatile such media. The processor 122 executes computer-executable code from the medium 124.

The computer-executable code includes a SAN software agent 128 that operates in relation to logical volumes 132. The SAN software agent 128 can include a logical volume manager 130. The logical volume manager 130 can be part of an operating system running on the client computing device 106A, and is a software component that can allocate, deallocate, resize, and perform other functionality in relation to logical volumes 132. The logical volume manager 130 can alone or in conjunction with other parts of the operating system implement higher-level storage functionality in relation to the logical volumes 132, such as redundancy and fault tolerance like RAID, high availability, snapshotting, deduplication, compression, encryption, mirroring, and so on.

The SAN software agent 128 interacts with the logical volume manager 130 to realize the logical volumes 132 on the drive volumes 118 of the storage drives 104. The SAN software agent 128 may be integrated within the operating system running on the client computing device 106A. The SAN software agent 128 receives commands over the fabric 102 to commission (and decommission) logical volumes 132 using specified drive volumes 118 on the storage drives 104. In response to such commands, the SAN software agent 128 controls the logical volume manager 130 to effectuate the logical volumes 132 at the client computing device 106A.

The SAN software agent 128 likewise controls the logical volume manager 130 or other component(s) of the operating system to effectuate higher-level storage functionality that the logical volumes 132 should have. For example, a logical volume 132 may be specified as a RAID volume realized by five drive volumes 118 of five different storage drives 104. The SAN software agent 128 thus controls the logical volume manager (or other component(s) of the operating system) to create a logical volume 132 at the client computing device 106A that achieves such RAID using the drive volumes 118 in question.

In response to access of the logical volumes 132 at the client computing device 106A, such as via I/O requests to read data from or write data to the logical volumes 132 generated by applications running on the computing device 106A, the SAN software agent 128 (such as the logical volume manager 130 thereof) sends commands over the fabric 102 to the appropriate storage drives 104, based on the configuration of the logical volumes 132 via the logical volume manager 130. The SAN software agent 128 thus handles I/O requests pertaining to data between the client computing device 106A and the storage drives 104. In effect, the SAN software agent 128 is a portion of a SAN controller, but just in relation to the logical volumes 132 allocated at the client computing device 106A. The SAN software agent 128 does not perform SAN controller functionality for any client computing device 106 other than the client computing device 106A of which it is a part.

The logical volumes 132 are depicted by dashed lines in FIG. 1 to indicate that while they are logically defined at the client computing device 106A, the underlying physical storage of the logical volumes 132 does not reside at the client computing device 106A. Rather, each logical volume 132 is physically implemented on one or more the physical storage media 116 of one or more storage drives 104. More specifically, each logical volume 132 is implemented by one or more drive volumes 118 of one or more storage drives 104. However, the SAN software agent 128 does not provision or deprovision the drive volumes 118, but rather receives commands over the fabric 102 instructing the agent 128 which logical volumes 132 to commission, and which drive volume 118 of which storage drives 104 to employ in doing so.

The SAN manager 108 is a node of the SAN that can be its own computing device, similar to one of the computing devices 106. As such, the SAN manager 108 can be software and hardware. The SAN manager 108 can also be software that runs on one of the client computing devices 106, or even one of the storage drives 104 if the processing capability of the storage drive 104 in question is sufficient. The SAN manager 108 generally manages the drive volumes 118 allocated on the storage drives 104, as well as the logical volumes 132 allocated on the client computing devices 106 that are realized by the drive volumes 118. The SAN manager 108, however, does not effect data transfer between the client computing devices 106 and the drive volumes 118 of the storage drives 104 that implement the logical volumes 132 of the client computing devices 106; rather, the SAN software agents 126 do.

The SAN manager 108 thus issues commands to the storage drives 104 to provision and deprovision the drive volumes 118 thereon. The SAN manager 108 similarly issues commands to the SAN software agents 128 of the client computing devices 106 to commission and decommission the logical volumes 132 thereon using specified drive volumes 118 of the storage drives 104. Because the SAN manager 108 is not responsible for data transfer between the client computing devices 106 and the storage drives 104 having the drive volumes 118 implementing the logical volumes 132 of the client computing devices 106, the SAN manager 108 may further periodically request status information from the storage drives 104 and the client computing devices 106. The SAN manager 108 request status information from the storage drives 104 regarding their drive volumes 118, and from the SAN software agents 128 of the client computing devices 106 regarding their logical volumes 132. The SAN manager 108 cannot glean such status information from the data transferred between the client computing devices 106 and the storage drives 104, since it is not responsible for such data transfer, in contradistinction to a conventional SAN controller that is responsible for both volume management and data transfer.

The SAN manager 108 can maintain its own management logical volume 134 that is realized by one or more drive volumes 118 of one or more storage drives 104, similar to the logical volumes 132 that the SAN manager 108 manages on the client computing devices 106. In this respect, the SAN manager 108 is also a client to the (host) storage drives 104, because data of the management logical volume 134 is stored on one or more physical storage media 116 of one or more storage drives 104. The SAN manager 108 can store on the management logical volume 134 which drive volumes 118 have been provisioned on which storage drives 104, as well as other information regarding the drive volumes 118 and/or the storage drives 104. The SAN manager 108 can likewise store on the management logical volume 134 which logical volumes 132 have been commissioned on which client computing devices 106, and which drive volumes 118 of which storage drives 104 implement these logical volumes 132. The SAN manager can store other information regarding the logical volumes 132 and/or the client computing devices 106 on the management logical volume 134, too.

The management logical volume 134 is referred to as a "management" logical volume 134 just to distinguish it from the logical volumes 132 of the client computing devices 106. The SAN manager 108 may employ a management logical volume 134 that uses one or more physical storage media 116 of one or more storage drives 104 instead of its own locally attached storage. Metadata regarding the SAN, such as the metadata regarding the storage drives 104, the drive volumes 118 provisioned on the storage drives 104, the client computing devices 106, and the logical volumes 132 created and mounted on the client computing devices 106 using the drive volumes 118, can be stored on the management logical volume 134.

Figure 2:
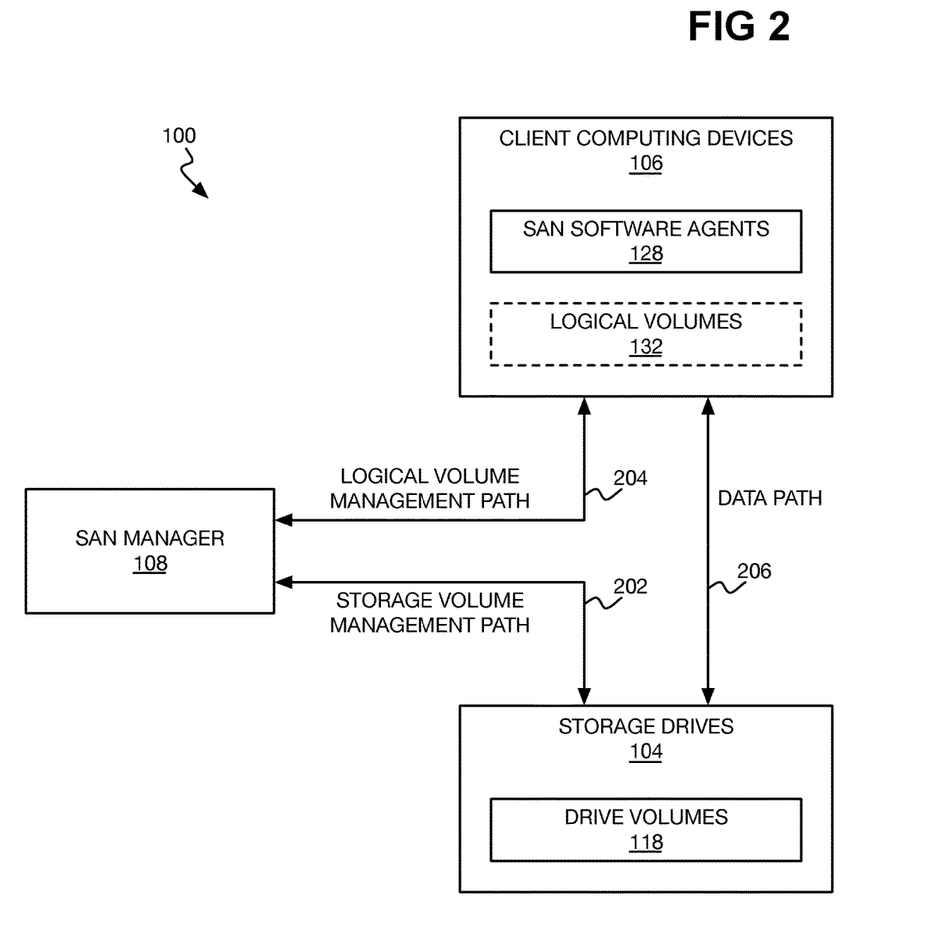
FIG. 2 is a diagram of the demarcation between control and data paths within an example distributed SAN system.

FIG. 2 shows how the example SAN system 100 is a distributed SAN system. The SAN manager 108 manages the drive volumes 118 on the storage drives 104, such that there is effectively a drive volume management path 202 between the SAN manager 108 and the storage drives 104. Each storage drive 104 can be said to operate just the drive volumes 118 physically stored on the storage drive 104. A storage drive 104 operates its drive volumes by 118 provisioning the drive volumes 118 as commissioned by the SAN manager 108 and by deprovisioning them as decommissioned by the SAN manager 108. A storage drive 104 may not be aware that there are other storage drives 104 within the SAN system 100, and/or may not be aware that the drive volumes 118 that it has provisioned is participating with drive volumes 118 of one or more other storage drives 104 to realize a logical volume 132 of a client computing device 106.

The SAN manager 108 manages the logical volumes 132 on the client computing devices 106 via the SAN software agents running on the computing devices 106, such that there is effectively a logical volume management path 204 between the SAN manager 108 and the SAN software agents 128 of the client computing devices 106. The SAN software agent 128 of each client computing device 106 can be said to operate just the logical volumes 132 thereof. The SAN software agent 128 of a client computing device 106 operates its logical volumes 134 by commissioning or allocating the logical volumes 132 using the drive volumes on the storage drives 104 as directed by the SAN manager 108, and by decommissioning or deallocating the logical volumes 132 as directed by the SAN manager 108. The SAN software agent 128 of a client computing device 106 may not be aware that there are other SAN software agents of other client computing devices 106 within the SAN system 100.

I/O access between the client computing devices 106 and the storage drives 104 to access the data of the logical volumes 132 physically stored on the drive volumes 118 occurs directly by the SAN software agents 128 of the client computing devices 106 (such by the logical volume managers 130 thereof) and does not involve the SAN manager 108. As such, there is effectively a data path 206 between the SAN software agents 128 of the client computing devices 106 and the storage drives 104. In this respect, it is noted that when the SAN manager 108 instructs the SAN software agent 128 of a client computing device 106 to commission a logical volume 132 using one or more specific drive volumes 118 of one or more specific storage drives 104, the software agent 128 does not itself provision (or subsequently deprovision) the drive volumes 118 on the storage drives 104. Rather, the SAN manager 108 does, and then instructs the SAN software agent 128 as to which drive volumes 118 on which storage drives 104 to subsequently use when accessing data of the logical volume 132 that the software agent 128 has been instructed to commission.

The SAN software agent 128 of each client computing device 106 is thus to operate the logical volumes 132 realized by the drive volumes 118 of the storage drives 104 by directly accessing the drive volumes 118 responsive to I/O requests generated within the client computing device 106. Likewise, each storage drive 104 is to operate the drive volumes 118 thereof by directly responding to access of its drive volumes 118 by the SAN software agents 128 of the client computing devices 106. Each storage drive 104 operates just its own drive volumes 118, and not those of other storage drives 104. The SAN software agent 128 of each client computing device 106 operates the logical volumes 132 thereof, and not those of other client computing devices 106.

Figure 3:
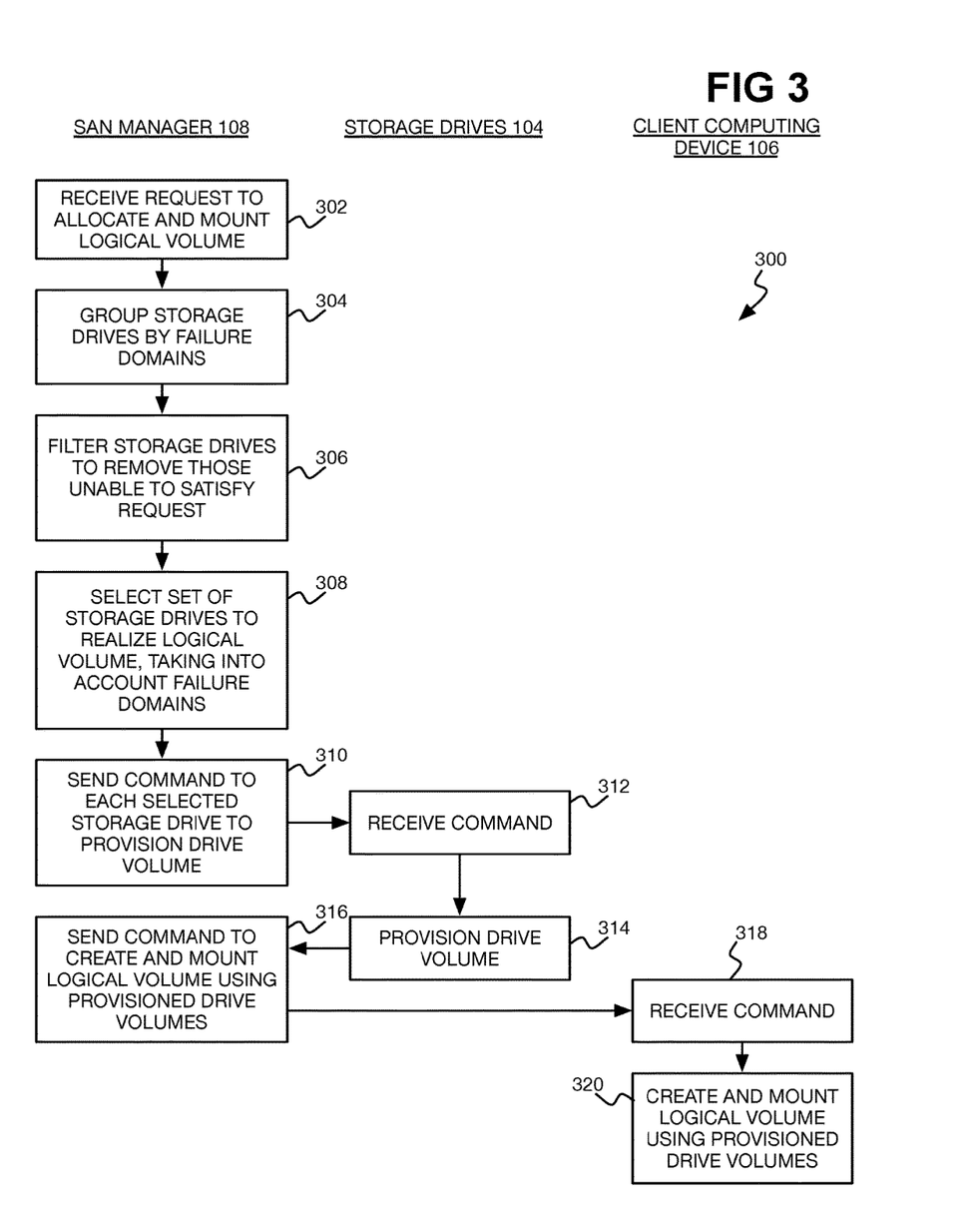
FIG. 3 is a flowchart of an example method to commission a logical volume on a client computing device of a distributed SAN system using drive volumes on storage drives of the distributed SAN system, including selection of which storage drives on which to realize the logical volume.

FIG. 3 shows an example method 300 for commissioning a logical volume on a client computing device 106 using drive volumes on storage drives 104 within the SAN system 100, including selecting which storage drives 104 are to realize the logical volume. The method 300 is divided into three columns corresponding to the SAN manager 108, the storage drives 104, and the client computing device 106. The SAN manager 108 performs the parts of the method 300 in the left column; the storage drives 104 perform the parts of the method 300 in the middle column; and the client computing device 106 (more specifically the SAN software agent 128 thereof, in conjunction with the logical volume manager 130 thereof) performs the parts of the method 300 in the right column.

The SAN manager 108 receives from an administrator a request to allocate and mount a logical volume on the client computing device 106 (302). The SAN manager 108 may expose a web interface by which an administrator logs onto the SAN manager 108, the SAN manager 108 may provide for direct local control by the administrator, or the SAN manager 108 may receive the request in a different manner. The request specifies at least characteristics regarding the logical volume to be created, such as the client computing device 106 on which the logical volume is to be created and the size of the logical volume.

The request may in varying degrees of specificity describe other characteristics of the logical volume. For instance, the request may specify the performance characteristics of the logical volume and the type of redundancy by which the logical volume is to be implemented, or the request may specify just quality-of-service (QoS) characteristics of the logical volume, which can be mapped to performance characteristics and redundancy type. The request in general can thus directly or indirectly specify the higher-level storage functionality of the logical volume, including RAID functionality, compression functionality, encryption functionality, mirroring functionality, snapshot functionality, deduplication functionality, and so on.

The storage drives are grouped into failure domains (304). The storage drives grouped into a given failure domain will fail when a failure to which the failure domain corresponds occurs. Stated another way, each failure domain corresponds to a group of the storage drives, such that a failure corresponding to the failure domain causes failure of each storage drive of the group.

As one example, a first group of storage drives may be connected to the fabric by a first network switch, and a second group of storage drives may be connected to the fabric by a second network switch. As to network connectivity of the storage drives, the storage drives are thus divided over two groups corresponding to the network switches by which they are communicatively connected to the fabric. This is because if the first network switch fails, the storage drives that employ this switch to connect to the fabric will effectively be in a failure state because they no longer can communicate within the SAN. Likewise, if the second network switch fails, the storage drives that employ this switch to connect to the fabric will effectively be in a failure state because they no longer can communicate with the SAN.

There can be different types of failures, however. Another type of failure, for instance, is related to power. For example, one group of storage drives may be powered by a first power source, and another group may be powered by a second power source. As to the source of power of the storage drives, the storage drives are therefore divided over two groups. If the first power source fails, the storage drives that receive power using this first power source will be in a failure state, whereas if the second power source fails, the storage drives that receive power using this second power source will be in a failure state.

Therefore, for each different type of failure, there can be distinct failure sub-domains. There can be failure sub-domains of a first failure sub-domain type corresponding to a power failure, where each failure sub-domain corresponds to a different power source failing. There can be failure sub-domains of a second failure sub-domain type corresponding to a network switch failure, where each failure sub-domain corresponds to a different network switch failing. There can be failure sub-domains of other failure domain sub-types as well.

Failure sub-domains of different sub-types may intersect with one another, and the failure sub-domains are combined as desired to ultimately yield the failure domains over which the storage drives are grouped or organized. For example, the storage drives connected to the fabric by a given network switch may not all be powered by the same power source. For the purposes of redundancy, some failure sub-domain types may be considered as more important, or crucial, than other failure sub-domain types. If the storage drives are powered by differing power sources that have proven to be very reliable, but the storage drives are connected to the fabric by network switches that have proven to be relatively less reliable, then the failure sub-domains corresponding to network connectivity are more important than the failure sub-domains corresponding to power for redundancy purposes.

Figure 4:
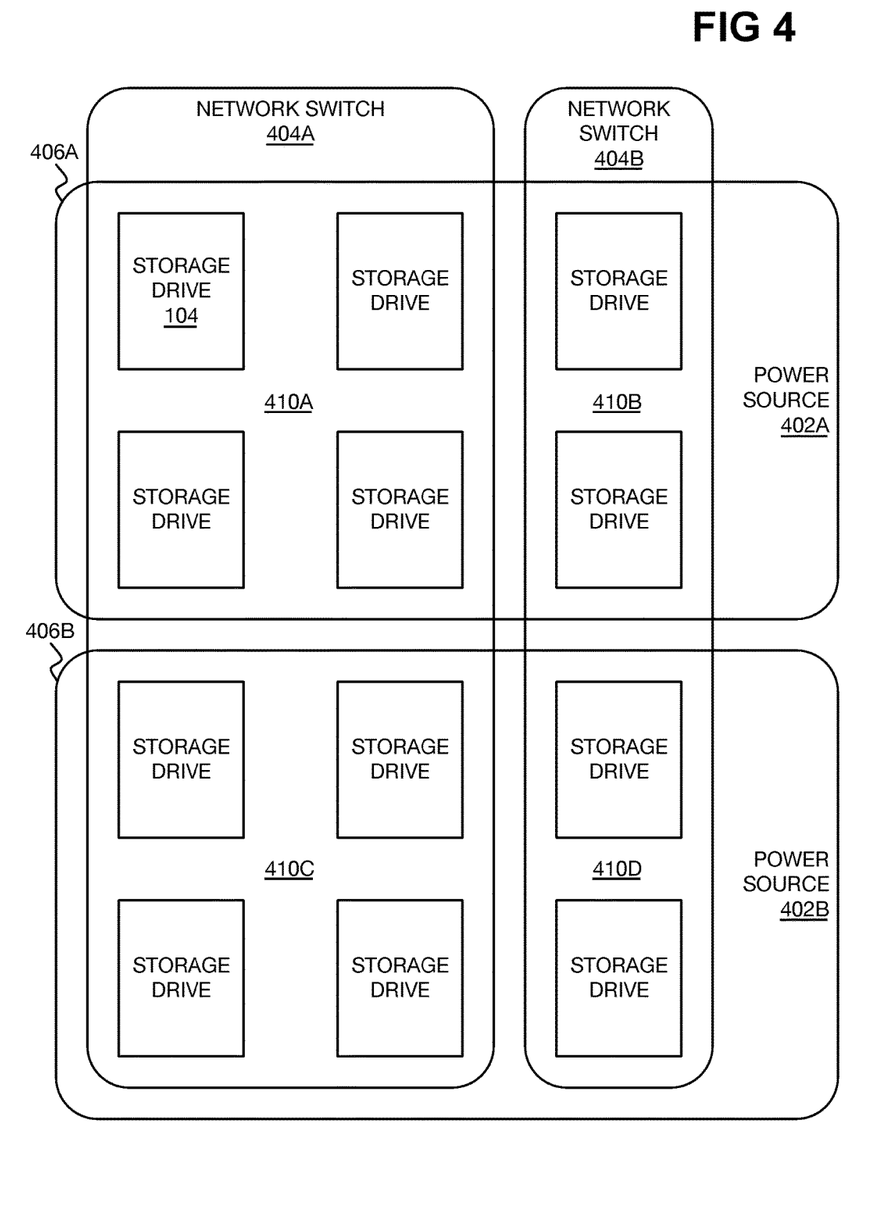
FIG. 4 is a diagram of example failure sub-domains over which storage drives of a distributed SAN system can be grouped.

FIG. 4 shows example failure sub-domains of two different failure sub-domain types in this respect. Each of twelve storage drives 104 is powered by one of two power sources 402A and 402B, collectively referred to as the power sources 402. Each of the twelve storage drives 104 is likewise connected to the fabric by one of two network switches 404A and 404B, collectively referred to as the network switches 404.

As to the failure sub-domain type corresponding to the power sources 402, there are two failure sub-domains 406A and 406B, collectively referred to as the failure sub-domains 406. The failure sub-domain 406A includes the top most six storage drives 104 of FIG. 4, whereas the failure sub-domain 406B includes the bottom most six storage drives 104. As to the failure sub-domain type corresponding to the network switches 404, there are similarly two failure sub-domains 408A and 408B, collectively referred to as the failure sub-domains 408. The failure sub-domain 408A includes the left most eight storage drives 104 of FIG. 4, whereas the failure sub-domain 408B includes the right most four storage drives 104.

The intersection of the failure sub-domain 406A and the failure sub-domain 408A can yield the failure domain 410A, including the four storage drives 104 that are in the upper left corner of FIG. 4. The intersection of the failure sub-domains 406A and 408B can yield the failure domain 410B, including the two storage drives 104 that are in the upper right corner. The intersection of the failure sub-domains 406B and 408A can yield the failure domain 410C, including the four storage drives 104 that are in the lower left corner. The intersection of the failure sub-domains 406B and 408D can yield the failure domain 410D, including the four storage drives 104 that are in the lower right corner.

Figure 5A:
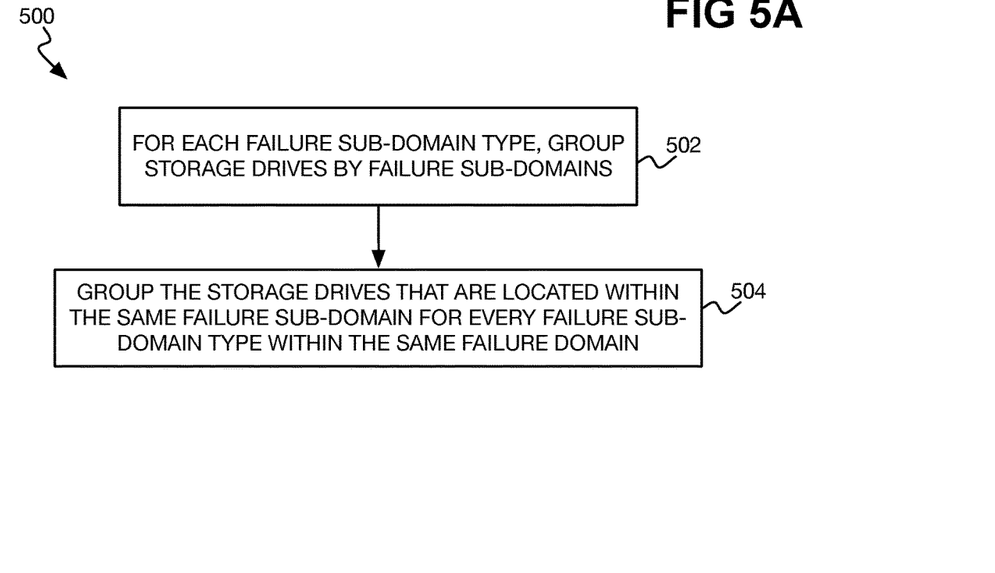
FIGS. 5A and 5B are flowcharts of example methods for grouping storage drives of a distributed SAN system into failure domains.

FIG. 5A shows an example method 500 for at least preliminarily grouping the storage drives 104 into different failure domains. For each failure sub-domain type, the storage drives 104 are grouped by failure sub-domains (502). Thus, as to the example of FIG. 4, for the failure sub-domain type corresponding to power, there are two failure sub-domains 406, and for the failure sub-domain type corresponding to network connectivity, there are two failure sub-domains 408.

The storage drives 104 that are located within the same failure sub-domain for every failure sub-domain type are grouped within the same failure domain (504). Thus, as to the example of FIG. 4, there are four resulting failure domains. A first failure domain includes the storage drives 104 that are connected to the fabric by the network switch 404A and powered by the power source 402A. A second failure domain includes the storage drives 104 that are also connected to the fabric by the network switch 404A but that are powered by the power source 402B. A third failure domain includes the storage drives 104 that are connected to the fabric by the network switch 404B and powered by the power source 402A. A fourth failure domain includes the storage drives 104 that are also connected to the fabric by the network switch 404B but that are powered by the power source 402B.

Figure 5B:
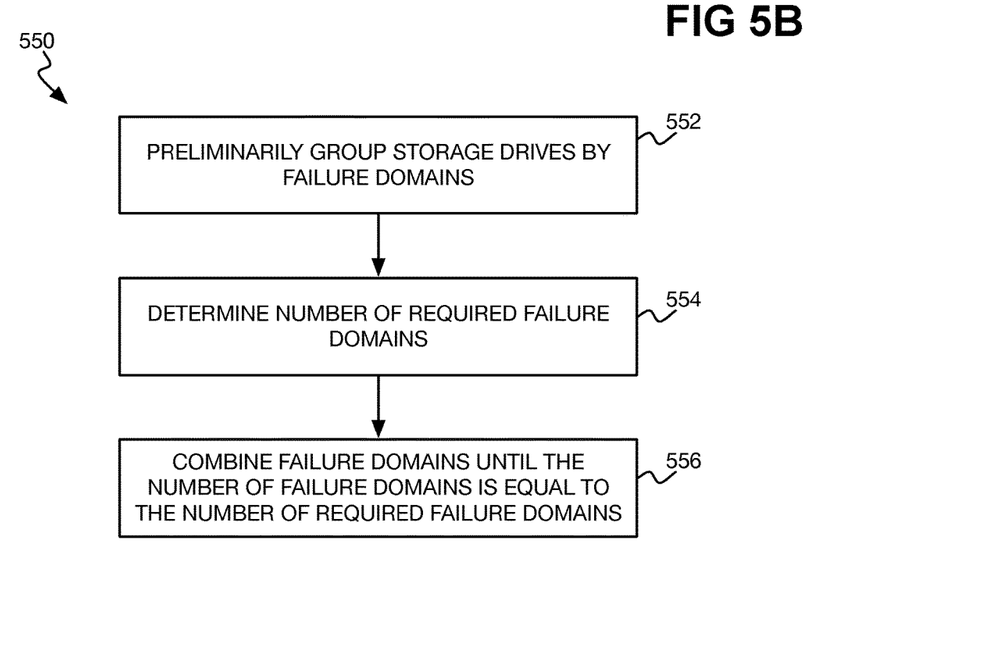

FIG. 5B shows an example method 550 for grouping the storage drives 104 within failure domains that can be employed in conjunction with the method 500. The storage drives 104 are preliminarily grouped by failure domains (552). For instance, this preliminary grouping may be achieved by performing the method 500 of FIG. 5A. Other ways to preliminarily group the storage drives 104 within failure domains can also be employed, however.

The number of required failure domains is determined from the request that the SAN manager 108 received in part 302 of the method to allocate and mount a logical volume (554). More specifically, the number of required failed domains can be determined from the redundancy requirements of the logical volume that is to be allocated and mounted in accordance with this request. For example, a logical volume that is to have RAID-1, or mirroring, redundancy requires a number of failure domains equal to the total number of mirrors of the data stored in the logical volume. If the logical volume is to be mirrored on a drive volume 118 of each of two storage drives 104, then there has to be (at least) two failure domains, so that each storage drive 104 on which a corresponding drive volume 118 is provisioned can be selected from a different failure domain.

As another example, a logical volume that is to have RAID-5, or striping and parity, redundancy requires a number of failure domains equal to the number of drive volumes 118 on which the logical volume is to be realized. If the logical volume is to be realized on five drive volumes 118 (of five different storage drives 104), then there has to be at (at least) five failure domains. This ensures that each storage drive 104 on which a corresponding drive volume 118 is provisioned can be selected from a different failure domain.

The failure domains are thus combined until the number of failure domains is equal to the number of required failure domains specified in the request (556). Such combination of failure domains takes into account the redundancy importance across the failure domains. For instance, as noted above, if redundancy as to fabric connectivity (by corresponding network switches) is more important than redundancy as to power (by corresponding power sources), then the failure domains corresponding to power are combined prior to combining failure domains corresponding to network switches.

As an example in relation to FIG. 4, the number of required failure domains may be three, whereas FIG. 4 shows four preliminary failure domains 410A, 410B, 410C, and 410D, collectively referred to as the failure domains 410, and which each correspond to a different network switch 404 and a different power source 402. If fabric connectivity redundancy is more important than power redundancy, then either the failure domains 410A and 410C can be combined or the failure domains 410B and 410D can be combined to yield three remaining failure domains. Combining the failure domains 410A and 410C or the failure domains 410B and 410D removes redundancy as to the power sources 402 in the resulting combined domain, but retains redundancy as to the network switches 404.

If power redundancy is more important than fabric connectivity redundancy, then either the failure domains 410A and 410B can be combined, or the failure domains 410C and 410D can be combined to yield three remaining failure domains. Combining the failure domains 410A and 410B or the failure domains 410C and 410C removes redundancy as to the network switches 404 in the resulting combined domain, but retains redundancy as to the network power sources 402. Therefore, redundancy as to the less important characteristic is removed when combining failure domains prior to redundancy as to the more important characteristic.

Referring back to FIG. 3, the SAN manager 108 also filters the storage drives 104 to remove those that are unable to satisfy the request (306). Such filtering can be performed before or after the storage drives 104 have been grouped by failure domains in part 304. The storage drives 104 are filtered by their native capabilities, available capacities, and dynamic performance thereof to remove from consideration any storage drive 104 that has insufficient native capabilities, available capacity, and/or dynamic performance to satisfy the logical volume requested to be allocated and mounted in part 302. That is, any storage drive 104 that is insufficient in one or more of these respects will not be selected on which to provision a drive volume 118 for the requested logical volume.

Figure 6:
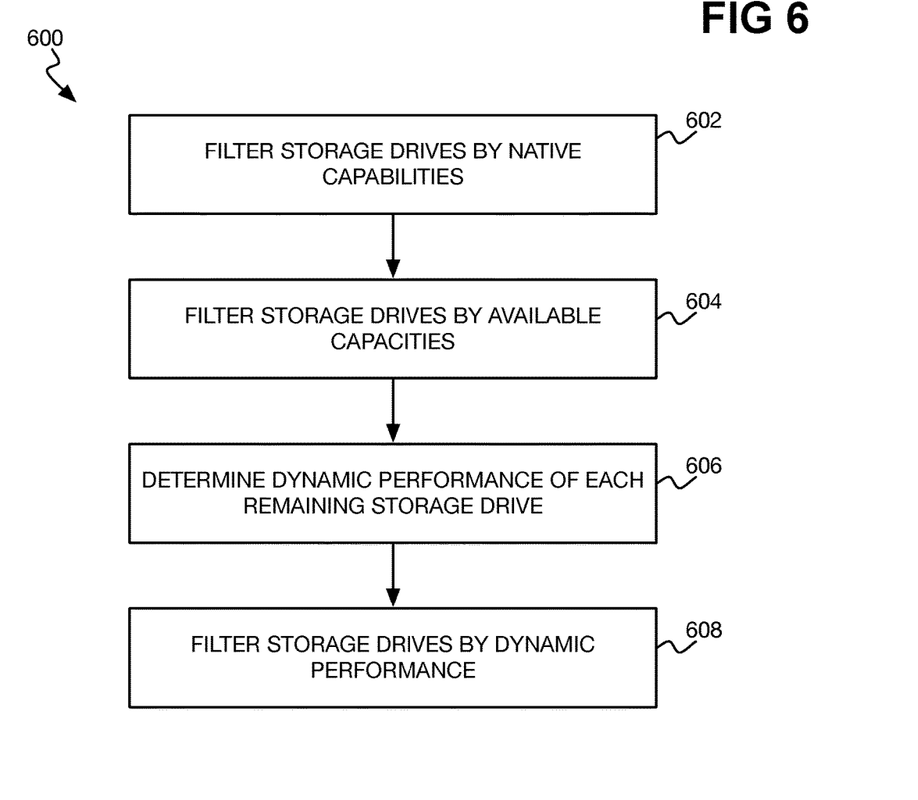
FIG. 6 is a flowchart of an example method to filter storage drives to those that can satisfactorily realize a requested logical volume.

FIG. 6 shows an example method 600 for filtering the storage drives 104 in part 306. The storage drives 104 are filtered by their native capabilities to remove any storage drive 104 that has insufficient native capabilities to satisfactorily realize the requested logical volume (602) and are also filtered by their available capacity to remove any storage drive 104 that has insufficient available capacity to satisfactorily realize the requested logical volume (604). Part 602 can be performed prior to, at the same time as, or after part 604.

The native capabilities of a storage drive 104 can include its type, connection technology, rated data transfer rate, internal data block storage size, and storage technology. Storage drive type can refer to whether a storage drive 104 is a programmable smart drive having its own integrated general purposing processing capability, or is a dumb drive that relies upon a separate controller. A logical volume may be requested to be created just using programmable storage drives. The request may instead not explicitly specify that just programmable storage drives be used, but may specify a logical volume that has certain QoS requirements or minimum performance requirements that can be satisfied just by programmable storage drives.

Storage drive connection technology can refer to the technology interface by which a storage drive 104 connects to the fabric. Examples of such connection technology include SAS, NVMe, and so on. A logical volume may be requested to be created using just a particular type of connection technology, or may not explicitly specify the connection technology but specify a logical volume that has certain QoS or performance requirements that can be satisfied just by certain types of connection technologies.

The rated data transfer rate refers to the transfer rate at which a storage drive 104 is rated, including read rates, write rates, or both. Such data transfer rates can be referred to via technology type, such as SAS-3 or SAS-4, as well as numerically, including input/output operations per second (TOPS). A logical volume request may specify a particular rated data transfer rate, or the request may specify certain QoS or performance requirements that can be satisfied just with a minimum transfer rate.

Internal data block storage size refers to the granular size of the data storage blocks by which a storage drive 104 stores data on its physical storage medium 116. Such storage sizes can include 512 bytes, 4,096 bytes, and so on. In general, the larger the internal data block storage size, the higher capacity and/or the better error correction capability a storage drive 104 can offer. As with the other native capabilities, a logical volume may specify a particular internal data block storage size, or the request may specify certain QoS or performance requirements that can be satisfied just by particular data block storage sizes.

The storage technology of a storage drive 104 can refer to the type of physical storage medium 116 on which the storage drive 104 stores data. The storage technology can be semiconductor flash memory, rotating magnetic media, and so on. The request may specify a particular type of storage technology, may specify a logical volume size that requires a particular type of storage technology, and/or may specify QoS or other performance requires that require a particular type storage technology type.

The available capacity of a storage drive 104 can include the actual space on the storage drive 104 that is not currently storing data, or the actual space that has not yet been allocated on the drive 104. As an example, a storage drive 104 may have a total capacity of four terabytes. The storage drive 104 may have already provisioned a drive volume 118 of three terabytes, but of which just one terabyte is currently being used to store data. The actual space on the drive 104 that is not storing data is just three terabytes, whereas the actual space that has not yet been allocated is one terabyte.

The size of the requested logical volume along with the redundancy requirements and other characteristics of the requested logical volume dictate how much available capacity is required on each storage drive 104 on which a drive volume 118 is to be provisioned to realize the logical volume. For example, a mirrored logical volume of two terabytes can require two drive volumes 118 on two storage drives 104 that are each two terabytes in size. By comparison, a striped logical volume of two terabytes that has no redundancy can require two drive volumes 118 on two storage drives 104 that are each one terabyte in size.

The result of parts 602 and 604 is a pruning of the storage drives 104 of the SAN system 100. A set of the remaining storage drives 104, from the perspective of their native capabilities and available capacities, can be selected to realize the requested logical volume. Each of these storage drives 104 has sufficient native capabilities and available capacity to satisfy the performance requirements, QoS requirements, and any other requirements of the request.

However, in actuality one or more of the remaining storage drives 104 may have sufficient dynamic performance to satisfy the request. For instance, a particular storage drive 104 may have already provisioned multiple drive volumes 118 that are heavily utilized. Therefore, even though such a storage drive 104 in theory (from the perspective of native capabilities and available capacity) can satisfactorily realize the requested logical volume, in actuality it is unlikely to provide the desired level of performance.

Therefore, the dynamic performance of each remaining storage drive 104 is determined (606), and the storage drives filtered by their dynamic performance (608). Parts 606 and 608 may be performed after part 602 because if a storage drive 104 does not have satisfactory native capabilities to realize the requested logical volume, then the storage drive 104 will be unable to have the requisite actual (dynamic) performance to satisfy the request. Similarly, parts 606 and 608 may be performed after part 604 because if a storage drive 104 does not have sufficient available capacity, then even if the storage drive 104 does have the requisite dynamic performance to satisfy the request, the storage drive 104 cannot be selected because it does not have enough available storage space.

Determining the dynamic performance of a storage drive 104 can be achieved in a number of different ways. The SAN manager 108 may retrieve dynamic characteristics that the storage drive 104 itself maintains, and which are indicative of the dynamic performance of the storage drive 104. For example, the number of I/O requests currently or on average that are stored in the queue on the drive 104 can be indicative of how well the storage drive 104 is likely to perform, where the greater the number of I/O requests pending (currently or on average), the lesser the likelihood that the storage drive 104 will satisfactorily realize the requested logical volume.

The SAN manager 108 may measure the dynamic performance between itself and the storage drive 104. For example, if the SAN manager 108 at least partially realizes its own management logical volume 134 on a drive volume 118 of the storage drive 104, the SAN manager 108 may perform I/O requests in relation to this drive volume 118 to assess the dynamic performance of the storage drive 104. As another example, the SAN manager 108 may instruct the storage drive 104 to create a small test drive volume 118 to permit the SAN manager 108 to perform such I/O requests.

The SAN manager 108 may instruct the SAN software agent 128 on the client computing device 106 that is to create the requested logical volume to measure the dynamic performance between this client computing device 106 and the storage drive 104. For example, the SAN manager 108 may instruct the storage drive 104 to create a small test drive volume 118, and then instruct the SAN manager 108 to measure I/O request throughput in relation to this drive volume 118. In this way, any anomalies with respect to the network path between the client computing device 106 and the storage drive 104 can be discerned.

Once the dynamic performance of each storage drive 104 has been determined, the storage drives 104 that remain after filtering by native capabilities and available capacities can likewise be filtered by their dynamic performance. The request for a logical volume may specify such performance explicitly, or may specify QoS or other requirements that dictate a minimum dynamic performance. The result of the method 600 is identification of the storage drives 104 that, by native capabilities, available capacities, and dynamic performance, are each able to satisfactorily realize the requested logical volume.

Referring back to FIG. 3, once the storage drives 104 have been grouped into failure domains and filtered to remove those storage drives 104 that are unable to satisfy the request, a set is selected from the remaining storage drives 104 to realize the requested logical volume (308). This selection takes into account the failure domains into which the storage drives 104 have been grouped in part 304. For instance, each needed storage drive 104 may be selected from a different failure domain to ensure adequate redundancy of the logical volume. For example, the SAN manager 108 may select two storage drives 104 from different failure domains randomly, or in another manner, to achieve a mirroring topology.

In general, the SAN manager 108 thus may pick each storage drive 104 from a different failure domain, but if there are multiple storage drives 104 within a failure domain from which to choose, the SAN manager 108 can make the selection by taking into account additional considerations. For instance, of the available storage drives 104 within a failure domain, the SAN manager 108 may select the storage drive 104 that minimizes the remaining capacity on the selected storage drive 104. As an example, if the requested logical volume requires one terabyte of space on a storage drive 104, and a failure domain includes a first storage drive 104 having 1.1 terabytes of available capacity and a second storage drive 104 having 1.5 terabytes, the SAN manager 108 may select the first storage drive 104. The SAN manager 108 may instead select the storage drive 104 of the available storage drives 104 within a failure domain to maximize the remaining capacity on the selected storage drive. In the prior example, the SAN manager 108 would select the second storage drive 104.

Another consideration that the SAN manager 108 may take into account is to select storage drives 104 from across the failure domains in a way to maximize sameness of the native capabilities of the storage drives 104. For example, the SAN manager 108 may have to select four storage drives 104 across four different failure domains. If each failure domain includes a storage drive 104 having identical (or nearly identical) native capabilities, then the SAN manager 108 may select these storage drives 104 to realize the requested logical volume. If there is more than one storage drive 104 within a particular failure domain that has these same identical native capabilities, the SAN manager 108 may select the storage drive 104 in accordance with the previous paragraph, to either maximize or minimize the available capacity of the selected drive 104 after the drive volume 118 for the requested logical volume has been realized on the selected drive 104.

The SAN manager 108 sends a command to each storage drive 104 of the selected set to provision a drive volume on the storage drive 104 (310). Each storage drive 104 within the selected set receives the command (312), and responsively provisions the requested drive volume (314). The SAN manager 108 then sends a command to the client computing device 106 to create and mount the logical volume with the requested characteristics using the drive volumes that have been provide on the storage drives of the selected set (316). The client computing device 106 receives the command (318), and responsively creates and mounts the logical volume with the requested characteristics using the provisioned drive volumes on the storage drives 104 of the selected subset (320).

In creating and mounting the logical volume, the client computing device 106 ensures that the logical volumes has the desired higher-level storage functionality specified within the request. For instance, if RAID functionality is specified, the RAID is implemented by the client computing device 106 using a software RAID approach. That is, the client computing device 106 implements RAID in relation to the specified drive volumes on the storage drives 104, not the SAN manager 108 or any of the storage drives 104 on which the drive volumes have been provisioned.

In the method 300, the SAN manager 108 is responsible for selecting which storage drives 104 are to provision drive volumes for the requested logical volume, not the client computing device 106 at which the logical volume is to be allocated. The SAN manager 108 is also responsible for sending commands to the storage drives 104 of the selected subset to provision drive volumes for the requested logical volume, not the client computing device 106 at which the logical volume is to be allocated. Likewise, the SAN manager 108 is responsible for sending a command to the client computing device 106 to allocate and mount the logical volume using the newly provisioned drive volumes on the storage drives 104. The storage drives 104 may be unaware that they participate with one another to realize the logical volume in question.

The techniques that have been disclosed herein thus provide for suitable selection of storage drives within a novel distributed SAN on which drive volumes are to be provisioned for a logical volume. After grouping the storage drives into failure domains, the storage drives can be successively filtered by native capabilities, available capacities, and dynamic performance thereof to remove from consideration any storage drive that will not be able to provision a drive volume that that will satisfactorily assist realization of the requested logical volume. From the storage drives that remain after filtering, a set of storage drives on which to provision drive volumes to realize the logical volume is selected, taking into account the failure domains in which the remaining storage drives are located.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage drives. It is manifestly intended that this invention be limited only by the claims and equivalents thereof.

We claim:

1. A method comprising:
   receiving, by a storage-area network (SAN) manager running on a computing device directly connected to a fabric, a request from an administrator to allocate and mount a logical volume on a client computing device directly connected to the fabric;
   grouping, by the SAN manager, storage drives directly connected to the fabric by failure domains in which the storage drives are located, by preliminarily grouping the storage drives by failure domains in which the storage drives are located, determining a number of required failure domains from the request, and combining the failure domains into which the storage drives have been grouped until the storage drives have been grouped into a number of the failure domains equal to the number of required failure domains;
   filtering, by the SAN manager, the storage drives by native capabilities, available capacities, and dynamic performance thereof to remove from selection consideration any storage drive having one or more of insufficient native capabilities, an insufficient available capacity, or an insufficient dynamic performance to satisfy the request;
   selecting, by the SAN manager, a set of storage drives on which to store data of the logical volume, from the storage drives that remain for the selection consideration after the storage drives have been filtered, including taking into account the failure domains in which the storage drives of the set are located in satisfaction of the request;
   sending, by the SAN manager, a command to each storage drive of the selected set to provision a drive volume; and
   sending, by the SAN manager, a command to a SAN software agent on the client computing device to create and mount the logical volume using the drive volumes provisioned on the storage drives of the set.

2. The method of claim 1, wherein each failure domain corresponds to a group of the storage drives such that a failure corresponding to the failure domain causes failure of each storage drive of the group.

3. The method of claim 1, wherein selecting the set of storage drives comprises selecting each storage drive of the set from a different failure domain.

4. The method of claim 1,
   wherein combining the failure domains comprises taking into account redundancy importance across the failure domains.

5. The method of claim 1, wherein the native capabilities of each storage drive comprise one or more of:
   a type of the storage drive;
   a connection technology of the storage drive;
   a rated data transfer rate of the storage drive;
   an internal data block storage size of the storage drive;
   a storage technology of the storage drive.

6. The method of claim 5, wherein selecting the set of storage drives comprises selecting the storage drives of the set to maximize sameness in the native capabilities thereof.

7. The method of claim 1, wherein selecting the set of storage drives comprises selecting the storage drives of the set to minimize remaining capacity on each storage drive after the drive volume has been provisioned on the storage drive.

8. The method of claim 1, wherein selecting the set of storage drives comprises selecting the storage drives of the set to maximize remaining capacity on each storage drive after the drive volume has been provisioned on the storage drive.

9. The method of claim 1, wherein filtering the storage drives comprises, after filtering the storage drives to remove from the selection consideration any storage drive having one or more of insufficient native capabilities, or the insufficient capacity:
   determining the dynamic performance for each storage drive that remains.

10. The method of claim 9, wherein determining the dynamic performance for each storage drive that remains comprises one of:
    retrieving from the storage drive dynamic characteristics maintained by the storage drive itself that are indicative of the dynamic performance of the storage drive;
    measuring the dynamic performance between the SAN manager and the storage drive;
    measuring the dynamic performance between the client computing device and the storage drive.

11. A non-transitory computer-readable data storage medium storing computer-executable code that a computing device directly connected to a fabric and running a storage-area network (SAN) manager executes to perform a method comprising:
    receiving a request from an administrator to allocate and mount a logical volume on a client computing device directly connected to the fabric;
    selecting a set of storage drives on which to store data of the logical volume, from storage drives directly connected to the fabric, based on native capabilities, available capacities, and dynamic performance of the storage drives, and taking into account failure domains in which the storage drives of the set are located in satisfaction of the request, wherein each failure domain corresponds to a group of the storage drives such that a failure corresponding to the failure domain causes failure of each storage drive of the group, the method further comprising:
    for each failure sub-domain type of a plurality of failure sub-domain types, preliminarily grouping the storage drives by failure sub-domains corresponding to the failure sub-domain type;
    determining a number of required failure domains from the request;
    combining the failure sub-domains into which the storage drives have been grouped until the storage drives have been grouped into a number of the failure domains equal to the number of required failure domains, taking into account redundancy importance across the failure domains;
    sending a command to each storage drive of the selected set to provision a drive volume; and
    sending a command to a SAN software agent on the client computing device to create and mount the logical volume using the drive volumes provisioned on the storage drives of the set.

12. The non-transitory computer-readable data storage medium of claim 11, wherein the method further comprises, prior to selecting the set of drives, one of:
    retrieving from each storage drive dynamic characteristics maintained by the storage drive itself that are indicative of the dynamic performance of the storage drive;
    measuring the dynamic performance between the SAN manager and each storage drive;
    measuring the dynamic performance between the client computing device and each storage drive.

13. The non-transitory computer-readable data storage medium of claim 11, wherein the method further comprises:
    filtering the storage drives by the native capabilities thereof to remove from selection consideration any storage drive having insufficient native capabilities,
    and wherein selecting the set of storage drives comprises selecting the storage drives of the set to maximize sameness in the native capabilities thereof.

14. The non-transitory computer-readable data storage medium of claim 11, wherein the method further comprises:
    filtering the storage drives by the available capacities thereof to remove from selection consideration any storage drive having insufficient available capacity,
    and wherein selecting the set of storage drives comprises selecting the storage drives of the set to one of minimize or maximize remaining capacity on each storage drive after the drive volume has been provisioned on the storage drive.

15. A storage-area network (SAN) system comprising:
    a plurality of fabric-attachable storage drives directly connected to a fabric, each storage drive of a set of the storage drives to provision and operate a drive volume;
    a client computing device directly connected to the fabric, and that is to execute a SAN software agent to create, mount, and use a logical volume realized by drive volumes of the set of storage drives; and
    a SAN manager directly connected to the fabric and that is to manage the drive volumes of the storage drives, to manage the logical volume that the SAN software agent operates, and is to select the set of the storage drives from the storage drives directly connected to the fabric on which the SAN software agent is to create, mount, and use the logical volume on drive volumes provisioned thereon,
    wherein the SAN manager is to select the set of the storage drives taking into account failure domains in which the storage drives are located, by preliminarily grouping the storage drives by failure domains in which the storage drives are located, determining a number of required failure domains from the request, and combining the failure domains into which the storage drives have been grouped until the storage drives have been grouped into a number of the failure domains equal to the number of required failure domains.

16. The SAN system of claim 15, wherein the SAN manager is to select the set of the storage drives based on native capabilities, available capacities, and dynamic performance thereof.

* * * * *